United States Patent

Wakabayashi et al.

[15] 3,685,026

[45] Aug. 15, 1972

[54] PROCESS OF SWITCHING AN ELECTRIC CURRENT

[72] Inventors: Takashi Wakabayashi; Shiro Hozumi, both of Osaka, Japan

[73] Assignee: Matsushita Electric Industrial Co. Ltd., Kadoma, Osaka, Japan

[22] Filed: Aug. 20, 1970

[21] Appl. No.: 65,487

[52] U.S. Cl. ....................340/173 R, 338/1, 338/20, 338/224

[51] Int. Cl. ....................G11c 11/00

[58] Field of Search ..340/173 R, 173 CH; 338/1, 13, 338/32, 225

[56] References Cited

UNITED STATES PATENTS 1,167,163 1/1916 Frank ....................340/173

3,486,156 12/1969 Welch ....................338/1

*Primary Examiner*—Terrell W. Fears
*Attorney*—Wenderoth, Lind & Ponack

[57] ABSTRACT

A process of switching an electric current. A switching element is provided which has finely divided conductive particles dispersed in resin, and which has a high resistance state and a low resistance state. A voltage is applied across said switching element in the high resistance state and is increased up to a first critical voltage to transform the high resistance state into the low resistance state to cause a high current to flow through said switching element. The voltage applied across said switching element in the low resistance state is decreased to a second critical voltage at which the low resistance state is transformed into the high resistance state to cause a low current to flow through said switching element.

12 Claims, 4 Drawing Figures

INVENTORS
TAKASHI WAKABAYASHI
SHIRO HOZUMI

BY Wenderoth, Lind & Ponack
ATTORNEYS

PROCESS OF SWITCHING AN ELECTRIC CURRENT

This invention relates to a process of switching an electric current, and more particularly relates to the use of a switching element having finely divided conductive particles dispersed in resin.

There are known various conductive materials having finely divided particles dispersed in organic resin. These conductive materials have been developed for use as conventional ohmic resistors or electrically conductive connectors between electrical components. There is no disclosure in the prior art of the possibility of making a switching element from organic resin having finely divided particles dispersed therein. Switching elements known in the prior art are various kinds of transistors, mechanical switches, and rectifiers such as selenium or cuprous oxide rectifiers. It is rather difficult to form these existing switching elements into a film form.

An object of the present invention is to provide a switching element having finely divided conductive particles dispersed in organic resin.

Another object of the present invention is to provide a process for switching an electric current by using a switching element which has finely divided conductive particles dispersed in resin.

These objects are achieved by providing a switching element which has finely divided conductive particles dispersed in resin and which has a high resistance state and a low resistance state. The process of switching an electric current by using such an element comprises applying a voltage across said switching element while it is in the high resistance state, increasing said voltage up to a first critical voltage to transform the high resistance state into a low resistance state, thereby causing a high current to flow through said switching element, and then decreasing said voltage applied across said switching element while it is in the low resistance state to a second critical voltage at which the low resistance state is transformed into the high resistance state, thereby causing a low current to flow through said switching element.

These and other features of this invention will be apparent from the following detailed description taken together with the accompanying drawings, wherein.

Figure 1:
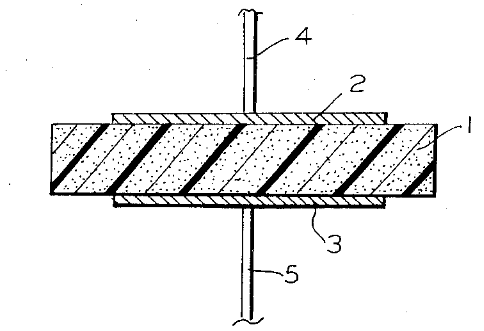
FIG. 1 is a cross-sectional view of an embodiment of a switching element according to the present invention.

The construction of a switching element contemplated by this invention will be explained with reference to FIG. 1. A conductive body 1 has finely divided conductive particles dispersed in resin. Two electrodes 2 and 3 are conductively attached to opposite surfaces of said conductive body 1. Two leads 4 and 5 and connected to said two electrodes 2 and 3, respectively, by any available and suitable method. The construction shown in FIG. 1 can be modified to the construction shown in FIG. 2 wherein similar references designate components similar to those of FIG. 1. Two electrodes 6 and 7 are conductively attached to one surface of said conductive body 1.

Figure 4:
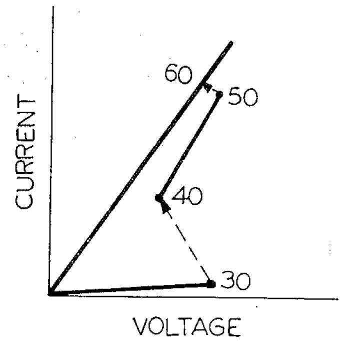
FIG. 4 is a graph illustrating exemplary voltage-current characteristics of a switching element according to the present invention.

The switching element according to the present invention has two electric conduction states, a high resistance state and a low resistance state, depending upon the voltage applied across the two leads 4 and 5, as shown in FIG. 4. When the voltage applied across the switching element, while it is in a high resistance state, is increased up to a first critical value 20, the conduction state of the switching element is transformed quickly from the high resistance state to the low resistance state. After the transformation into the low resistance state, an increase in the voltage causes a high current to flow through the switching body. The high current increases almost linearly with an increase in the voltage. When the voltage is lowered to a second critical value 21, the switching element transforms quickly from the low resistance state to the high resistance state. A further decrease in the voltage results in an almost linear decrease in the current to zero. The switching element according to the present invention can repeat this cycle of voltage-current characteristics, i.e., the transformation between the high resistance state and the low resistance state.

The switching element according to the present invention can be operated by using a combination of a biasing voltage and pulses. The switching element is provided with a biasing voltage which is smaller than the first critical voltage 20 and larger than the second critical voltage 21. When a pulse having larger voltage than the first critical voltage 20 is superposed upon the biasing voltage, the element is quickly transformed from the low resistance state to the high resistance state. An operable width of such pulses ranges from $10^{-6}$ to $10^{-4}$ second.

The resin 12 has a great effect on the transition time for transformation from the low resistance state to the high resistance state. A faster transition time can be obtained when the resin 12 has chlorine or bromine atoms incorporated therein. The incorporation of chlorine or bromine atoms can be achieved by using a mixture of resin and a chlorine or bromine compound or a chlorine or bromine derivative resinous compound.

Preferable mixtures are as follows: polyethylene, polystyrene, poly(methyl methacrylate), polyacetal, polycarbonate, polyamide, polyester, phenol-formaldehyde resin, epoxy resin, silicon resin, alkyd resin, polyurethane resin, polyimides resin, phenoxy resin, polysulfide resin and polyphenylene oxide resin. These materials can be used by themselves or can have admixed therewith a low molecular chloro- or bromo-compound such as chlorinated paraffine, chlorinated fatty ester, chlorinated fatty alcohol, chlorinated fatty amine, chlorinated amides, 1.2.3-tribromopropane, 1.2-dibromochloropropane, 1.2.3.4-tetra bromobutane, 1.2-dibromo-1.1.2.2-tetrachloroethane, tris (2-chloroethyl) phosphite and perchloropentacyclodecane.

Preferable compounds for use in the resin are as follows:

1. chlorine or bromine-containing vinylpolymer such as polyvinyl chloride, polyvinyldenechloride, polyvinyl bromide and poly (p-chlorostyrene);

2. chlorosubstituted polyolefine such as chlorinated polyethylene and chlorinated polypropylene;

3. chlorinated diene polymer such as chlorinated natural rubber;

4. chlorine or bromine-containing epoxy resins.

Among those various resins, chlorinated natural rubber produces the best result.

The finely divided conductive particles preferably have an average particle size of 0.1 to 10 microns. The most preferred average particle size is 0.2 to 1 microns. Both the critical voltages become unstable over a period of operating time when the average particle size is less than 0.1 micron. On the contrary, when the average particle size is 0.2 to 1 microns. Both the critical voltages become unstable over a period of operating time when the average particle size is less than 0.1 micron. On the contrary, when the average particle size is more than 10 microns, the resultant critical voltages deviate widely from the desired voltages. The average particle size is determined by the methods of sedimentation analysis and electron microscopy.

A preferred material for the finely divided conductive particles 11 is one member selected from the group consisting of silver, iron, copper, carbon black and graphite. Among those materials, silver particles give the best result.

Figure 3:
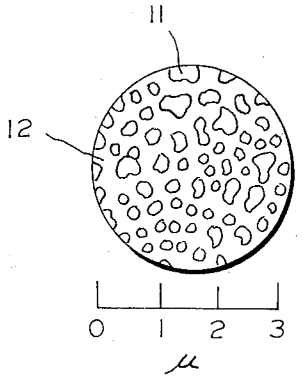
FIG. 3 is an enlarge partial cross-section of a conductive body according to the present invention.

Referring to FIG. 3, finely divided conductive particles 11 are dispersed in resin 12. The distance between individual conductive particles 11 has a significant effect on the switching action of the element of this invention. Any conductive particles 11 which are in contact with other particles make no contribution to the switching action. A greater interparticle distance produces a conductive body 1 having a higher electrical resistivity and makes the first critical voltage higher. An electron microscopic observation indicates that a distance of 500 to 10,000 A is operable for accomplishing switching action. The distance is dependent upon the average particle size of the finely divided conductive particles, the volume of finely divided conductive particles relative to the volume of the resin, and the distribution of finely divided conductive particles in the resin. The percentage of the total folume of resin and particles occupied by finely divided conductive particles is determined by the specific gravity of the finely divided conductive particles and the resin and the average particle size of the finely divided conductive particles. For example, when silver particles having an average particle size of 0.5 microns are dispersed in resin, the percentage of the volume occupied by silver particles is 20 to 10 percent, and that by resin is 80 to 90 percent. When carbon black having an average particle size of 0.25 microns is dispersed in resin, the percentage of the volume occupied by carbon black is 6 to 25 percent and that by resin is 94 to 75 percent.

A conductive body 1 according to the present invention can be formed by any available and suitable manner. A given amount of resin is dissolved in any suitable solvent. The amount of solvent is chosen so that the resulting solution has a viscosity of about 10 poise. Finely divided conductive particles in the desired amount are added to the solution. The amount of finely divided conductive particles must be such as to occupy the deserved percentage of the volume relative to the resin. The mixture is mixed well by any suitable method, for example a ball mill, to produce a homogeneous paint having finely divided conductive particles dispersed uniformly in the solution. The homogeneous paint is applied to any suitable substrate acting as an electrode and is heated to evaporate the solvent. The cured paint is provided, at one surface, with another electrode by any suitable method, for example, vacuum metal deposition or application of conductive ink.

Another method for preparing the conductive body is to heat said homogenous paint for achieving evaporation of the solvent. The heated paint is a homogenous mixture of finely divided conductive particles and resin. The homogenous mixture is treated to form a film according to well-known plastic film forming technology or to form a thin plate according to well-known plastic molding method. The film or thin plate is provided, on opposite surfaces, with electrodes by any suitable method, for example vacuum metal deposition or application of conductive ink.

EXAMPLE 1

Figure 2:
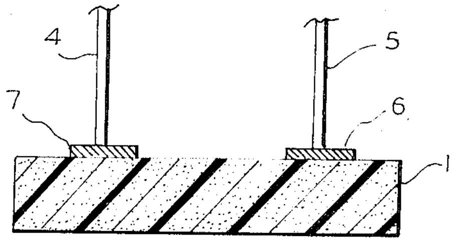
FIG. 2 is a cross-sectional view of another embodiment of a switching element according to the present invention.

A series of elements are prepared each having a different proportion of conductive material. One weight portion of chlorinated natural rubber having 68 weight percent of chlorine incorporated therein is dissolved in 5 weight portions of ortho dichloro-benzene. Silver powder having an average particle size of 0.5 microns is dispersed uniformly in the solution to form a homogeneous paint. The weight percentages of silver powder and chlorinated natural rubber are adjusted to be 30 to 80 percent and 70 to 30 percent, respectively, for the different elements. The homogeneous paint is applied to alumina substrate and is heated at 170° C for 1 hour. The heated paint is provided with two aluminum electrodes as shown in FIG. 2 by a vacuum deposition method. The conductive body 1 has a thickness of 0.15 mm and a width of 5 mm. The distance between the two electrodes is 5 mm. Two leads are connected to the two electrodes by using a conventional conductive adhesive.

Silver powder in an amount greater than 58 weight percent is found to form a conventional conductive body having only a low resistance state. Silver powder in an amount less than 43 weight percent is found to form an insulating body having a high electrical resistance similar to that of chlorinated natural rubber. Silver powder in an amount of 43 to 58 weight percent is found to form a switching element having both a high resistance state and a low resistance state in accordance with the present invention. Table 1 shows the electrical properties of the above switching elements.

TABLE 1

| Weight Percent of Silver Powder | First Critical Voltage (volt) | Electrical Resistance in Low Resistance State (Ω) |
|---|---|---|
| 43 | 400 | $5 \times 10^6$ |
| 50 | 100 | $2 \times 10^5$ |
| 55 | 10 | $8 \times 10^3$ |
| 58 | 0.5 | $1 \times 10^3$ |

These switching elements have an electrical resistance higher than $10^9$Ω in the high resistance state.

EXAMPLE 2

The following materials of Table 2 are used as finely divided conductive particles:

TABLE 2

| Material | | Silver | Carbon Black | Iron | Copper |
|---|---|---|---|---|---|
| Average Particle Size (μ) | | 0.5 | 0.25 | 3 | 5 |
| Weight Percent (%) | | 55 | 9.1 | 70 | 60 |
| First Critical Voltage (v) | | 100 | 35 | 50 | 150 |
| Electrical Resistance (Ω) | in low resistance state | $8\times10^3$ | $2\times10^6$ | $6\times10^5$ | $1.5\times10^5$ |
| | in high resistance state | $9.8\times10^{10}$ | $8.5\times10^{10}$ | $1\times10^{11}$ | $1\times10^{11}$ |

Switching elements using these materials are prepared in a manner similar to that of Example 1. Table 2 shows the electrical properties of those switching elements.

EXAMPLE 3

The finely divided conductive particles used are silver powder having an average particle size of 0.2, 0.5, 1 and 10 microns, respectively. The weight percentage of silver powders is shown in Table 3.

TABLE 3

| Material | | Silver | Carbon Black | Iron | Copper |
|---|---|---|---|---|---|
| Average Particle Size (μ) | | 0.2 | 0.5 | 1 | 10 |
| Weight Percent (%) | | 40 | 50 | 65 | 93 |
| First Critical Voltage (v) | | 20 | 100 | 200 | 400 |
| Electrical Resistance (Ω) | in low resistance state | $4\times10^4$ | $2\times10^5$ | $5\times10^5$ | $7\times10^5$ |
| | in high resistance state | $9.5\times10^{10}$ | $7\times10^{10}$ | $4\times10^{11}$ | $2\times10^{10}$ |

The switching elements including these silver powders are prepared in a manner similar to that of Example 1 and have electrical properties shown by Table 3.

EXAMPLE 4

Silver powder having an average particle size of 0.5 microns is dispersed in various resins listed in Table 4. The weight percentage of silver powder is 50 percent and that of the resin is 50 percent.

TABLE 4

| Resin | Solvent | First Critical voltage (v) | Electrical Resistance Low State (Ω) | Electrical Resistance High State (Ω) |
|---|---|---|---|---|
| Polyvinyldene chloride | o-dichlobenzene | 30 | $3\times10^5$ | $9\times10^{10}$ |
| Chlorinated Polyethylene (chlorine content 40%) | tetrahydrofurane | 100 | $5\times10^5$ | $7\times10^{10}$ |
| Polystyrene 75 Wt% Chlorinated paraffine ($C_{24}H_{29}Cl_{21}$) 25Wt% | toluene | 50 | $2\times10^3$ | $4\times10^{10}$ |
| Polystyrene 90Wt% Methylester of pentachlorostearicacid 10Wt% | toluene | 20 | $2\times10^3$ | $3\times10^9$ |
| Polymethyl methacrylate 80Wt% 1.2-bromo-1.1.2/2-tera-chioro ethane 20Wt% | toluene | 15 | $5\times10^5$ | $5\times10^{10}$ |

The various resins are dissolved in solvents listed in Table 4 so as to form solutions having a viscosity of about 10 poise. Various switching elements are prepared in a manner similar to that of Example 1. Table 4 shows the electrical properties of the resultant switching elements.

What is claimed is:

1. A process of switching an electric current, which comprises providing a switching element comprising resin having finely divided conductive particles dispersed therein and which has a high resistance state and a low resistance state, applying a voltage across said switching element while it is in the high resistance state, increasing said voltage up to a first critical voltage to transform the high resistance state into the low resistance state for causing a high current to flow through said switching element, and decreasing said voltage applied across said switching element while it is in the low resistance state to a second critical voltage at which the low resistance state is transformed into the high resistance state for causing a low current to flow through said switching element.

2. A process of switching an electrical current as claimed in claim 1, wherein said finely divided conductive particles have an average particle size of 0.1 to 10 microns.

3. A process of switching an electrical current as claimed in claim 1 wherein said finely divided conductive particles are a material selected from the group consisting of silver, iron, copper, carbon black and graphite.

4. A process of switching an electrical current as claimed in claim 3 wherein said finely divided conductive particles are silver powder having average particle size of 0.2 to 1 micron.

5. A process of switching an electrical current as claimed in claim 1 wherein said finely divided conductive particles are spaced from each other an average distance of 500 to 10,000 A.

6. A process of switching an electrical current as claimed in claim 1 wherein said resin consists essentially of one member selected from the group consisting of: (1) chlorine or bromine-containing vinylpolymer; (2) chlorosubstituted polyolefine; (3) chlorinated diene polymer; and (4) chlorine or bromine-containing epoxy resins.

7. A process of switching an electrical current as claimed in claim 6 wherein said resin is chlorinated natural rubber.

8. A process of switching an electrical current as claimed in claim 6 wherein said vinyl polymer is one taken from the group consisting of polyvinyl chloride, polyvinyldenechloride, polyvinyl bromide, and poly(p-chlorostyrene).

9. A process of switching an electrical current as claimed in claim 6 wherein said chlorosubstituted polyolefine is one taken from the group consisting of polyethylene and chlorinated polypropylene.

10. A process of switching an electrical current as claimed in claim 1 wherein said resin has incorporated therein atoms taken from the group consisting of chlorine and bromine.

11. A process of switching an electrical current as claimed in claim 10 wherein said resin consists essentially of one member selected from the group consisting of: (a) polyethylene, (b) polystyrene, (c) poly(methyl methacrylate), (d) polyacetal, (e) polycarbonate, (f) polyamide, (g) polyester, (h) phenol-formaldehyde resin, (i) epoxy resin, (j) silicon resin, (k) alkyd resin, (l) polyurethane resin, (m) polyimide resin, (n) phenoxy resin, (o) polysulfide resin, (p) polyphenylene oxide resin, and (q) one of the members a, b, c, d, e, f, g, h, i, j, k, l, m, n, o, and p having admixed therewith at least one member selected from the group consisting of chlorinated paraffine, chlorinated fatty ester, chlorinated fatty alcohol, chlorinated fatty amine, chlorinated amides, 1.2.3-tribromopropane, 1.2-dibromochloropropane, 1.2.3.4-tetra bromobutane, 1.2-dibromo-1.1.2.2-tetrachloroethane tris (2-chloroethyl) phosphite and perchloropentacyclodecane.

12. A process of switching an electrical current as claimed in claim 1 in which a biasing voltage is applied to said switching element which is smaller than the first critical voltage and larger than the second critical voltage, and supplying a pulse of a voltage larger than the first critical voltage for switching the element from the high resistance state to the low resistance state, and supplying a pulse of a voltage smaller than the second critical voltage for switching the element from the low resistance state to the high resistance state.

* * * * *